United States Patent
Campbell

(10) Patent No.: US 7,706,212 B1
(45) Date of Patent: Apr. 27, 2010

(54) MOBILITY DIRECTOR DEVICE AND CANE FOR THE VISUALLY IMPAIRED

(76) Inventor: Terry L. Campbell, 5435 Vista Creek, San Antonio, TX (US) 78247

( * ) Notice: Subject to any disclaimer, the term of this patent is extended or adjusted under 35 U.S.C. 154(b) by 115 days.

(21) Appl. No.: 12/021,803

(22) Filed: Jan. 29, 2008

Related U.S. Application Data

(60) Provisional application No. 60/898,372, filed on Jan. 30, 2007.

(51) Int. Cl.
  *A45B 3/00* (2006.01)
  *G01S 15/04* (2006.01)
(52) U.S. Cl. .................................................. 367/116
(58) Field of Classification Search .................. 367/116; 342/24; 135/66, 65; 434/112; 250/224
  See application file for complete search history.

(56) References Cited

U.S. PATENT DOCUMENTS

| | | | |
|---|---|---|---|
| 3,198,952 A * | 8/1965 | Benham et al. ............. 250/224 |
| 3,546,467 A * | 12/1970 | Benham A et al. ............ 342/24 |
| 4,280,204 A | 7/1981 | Elchinger | |
| 2004/0252030 A1* | 12/2004 | Trimble et al. ......... 340/825.36 |
| 2008/0169011 A1* | 7/2008 | Ewell et al. .................... 135/66 |
| 2008/0251110 A1* | 10/2008 | Pede ........................... 135/66 |

* cited by examiner

*Primary Examiner*—Dan Pihulic
(74) *Attorney, Agent, or Firm*—Eric Karich

(57) ABSTRACT

A mobility cane for use by a visually impaired person has a handle portion having an outer surface, an elongated member extending from the handle, a detection apparatus operably mounted on the mobility cane, and a plurality of vibrating tactile transmitters arrayed on the outer surface of the handle operably connected to the detection apparatus.

1 Claim, 4 Drawing Sheets

MOBILITY DIRECTOR DEVICE AND CANE FOR THE VISUALLY IMPAIRED

CROSS-REFERENCE TO RELATED APPLICATIONS

This application for a utility patent claims the benefit of U.S. Provisional Application No. 60/898,372, filed Jan. 30, 2007. The previous application is hereby incorporated by reference in its entirety.

STATEMENT REGARDING FEDERALLY SPONSORED RESEARCH

Not Applicable

BACKGROUND OF THE INVENTION

1. Field of the Invention

This invention relates generally to canes for the visually impaired, and more particularly to a mobility director device and cane for the visually impaired.

2. Description of Related Art

A well known problem in the field of mobility canes is the narrow search area that the conventional cane provides. Traditional canes do not provide warning of many potential obstacles of their surroundings, particularly obstacles that extend into a walkway above a person's waist. While the traditional cane warns of changes along the ground, it does not warn of other walking hazards such as low-hanging tree limbs and the like.

The following art defines the present state of this field:

Elchinger, U.S. Pat. No. 4,280,204, teaches a conventional mobility cane for the blind that incorporates a compact, dual-mode, ultrasonic obstacle detection sensor. The size of the protective zone associated with the sensor is variable. In one mode, the sensor warns of low lying objects that might contact the upper extremities of the user. In another mode, the user can determine the presence or absence of more remote objects. The user is warned of the presence of objects within the zone by an audible warning.

The above-described references are hereby incorporated by reference in full.

The prior art teaches a single-zone detector with an audible alert for use with a mobility cane. However, the prior art does not teach a way to continuously monitor multiple zones along. Nor does the prior art teach a way to warn the user of the vicinity of the object, such as whether the object is to the user's right or left. The present invention fulfills these needs and provides further related advantages as described in the following summary.

SUMMARY OF THE INVENTION

The present invention teaches certain benefits in construction and use which give rise to the objectives described below.

The present invention provides a mobility cane for use by a visually impaired person. The mobility cane has a handle portion having an outer surface, an elongated member extending from the handle, a detection apparatus operably mounted on the mobility cane, and a plurality of vibrating tactile transmitters arrayed on the outer surface of the handle operably connected to the detection apparatus.

A primary objective of the present invention is to provide a mobility director device and cane for the visually impaired having advantages not taught by the prior art.

Another objective is to provide a mobility director device and cane designed to detect objects in multiple spatial zones.

A further objective is to provide a mobility director device and cane designed to warn the user not only of the detection of an object, but also where the object is located relative to the user.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a mobility detector device and cane 10 ("mobility cane"), for use by a visually impaired person 12. The mobility cane 10 is designed to enable the visually impaired user 12 to be more aware of his surroundings within specific areas and alert the user of obstacles within those zones.

Figure 1:
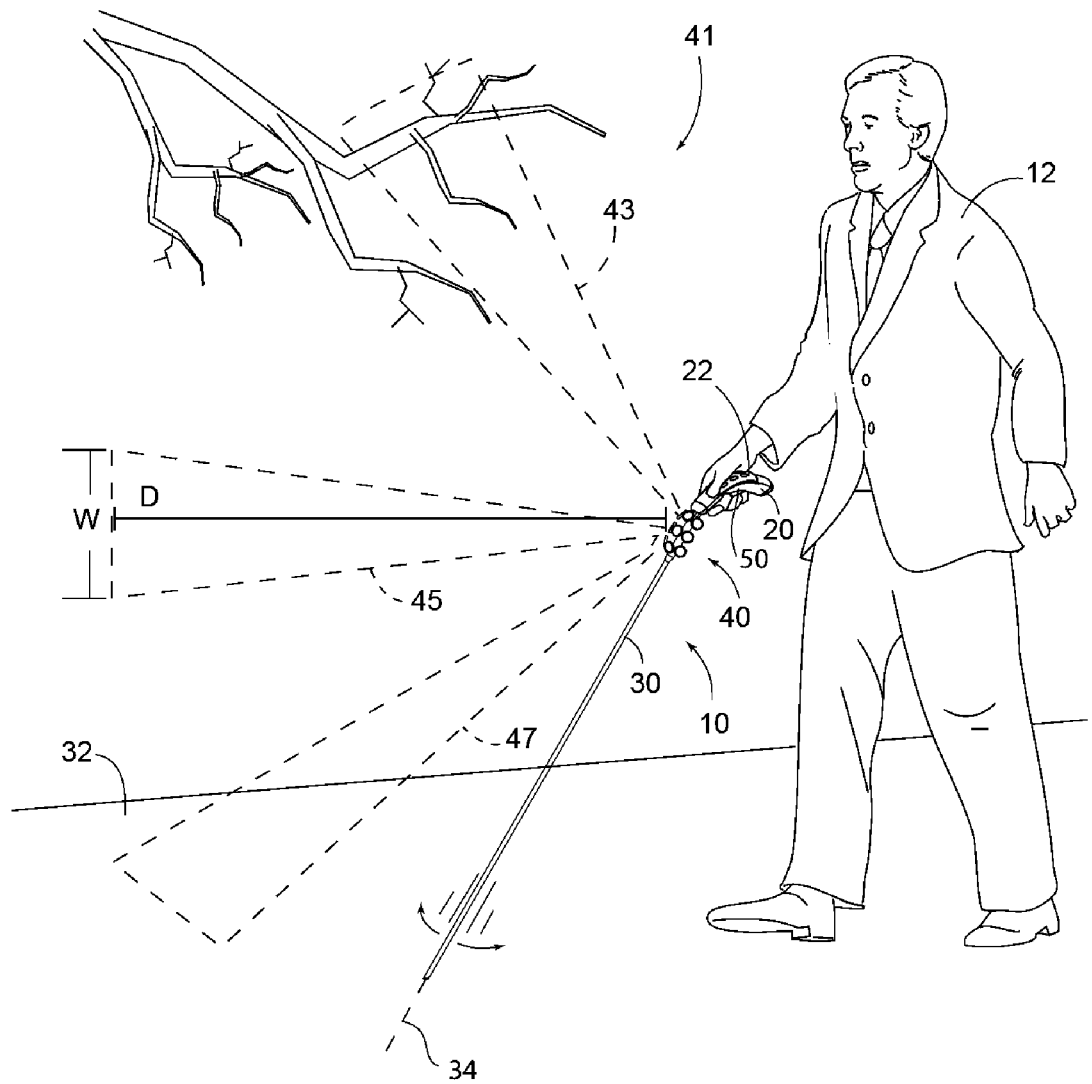
FIG. 1 is a perspective view of a mobility director device and cane according to one embodiment of the present invention.

FIG. 1 is a perspective view of the mobility cane 10 according to one embodiment of the present invention. As shown in FIG. 1, the mobility cane 10 is comprised of a handle 20 having an outer surface 22 and an elongated member 30 extending from the handle 20. A detection apparatus 40 is operably mounted on the mobility cane 10. A vibrating tactile transmitter 50 is mounted on the handle 20 and operably attached to the detection apparatus 40. In one embodiment, the vibrating tactile transmitter 50 includes a plurality of vibrating tactile transmitters 50 arrayed on the outer surface 22 of the handle 20.

The handle 20 of the mobility cane 10 may be shaped to fit the hand of a person. The outer surface 22 of the handle 20 should be large enough to accommodate the plurality of vibrating tactile transmitters 50. In this embodiment, the handle 20 is easy to grasp and has a generally cylindrical shape.

In one embodiment, the elongated member 30 extends from the handle 20 to a ground surface 32. The elongated member 30 may extend along a longitudinal axis 34 capable of being maintained at a fairly constant angle with respect to the ground surface 32 by an extended hand of the ambulatory visually impaired person 12. The elongated member 30 should be long enough to enable the elongated member 30 to be held at an acute angle with respect to the ground surface 32. This construction is similar in construction to standard walking canes known in the art.

The length of the elongated member 30 is usually determined by the height of the visually impaired person. Other embodiments may be designed by those skilled in the art where the elongated member 30 may have a different shape or size but is still useful in aiding the visually impaired person.

In other embodiments (not shown), the elongated member 30 may be retractable or foldable to either adjust the length of the elongated member 30, shorten the elongated member 30, or store the elongated member 30 within the handle 20. When the elongated member 30 is shortened or retracted into the handle 20, the mobility cane 10 may be used solely as an electronic sensing device, without the obtrusive elongated member 30.

The detection apparatus 40 can be located anywhere along the mobility cane 10 such that the detection apparatus 40 would aid in the detection of objects that may impede the ambulatory movement of the visually impaired person 12. In this embodiment, the detection apparatus 40 is mounted between the handle 20 and the elongated member as shown in FIG. 1.

As shown in FIG. 1, the detection apparatus 40 is mounted on the mobility cane 10 for sensing objects within a predetermined spatial zone 41. The detection apparatus 40 would preferably be able to detect any objects within the spatial zone 41 that might impede the ambulatory movement of the visually impaired person 12. In other embodiments, the spatial zone 41 may be manually adjustable by the visually impaired person 12 by either physical or electrical measures.

The detection apparatus 40 may be adjustably mounted on the mobility cane 10 so that a user may change the area that the detection apparatus 40 is meant to detect, customizing the detection apparatus 40 for his or her personal tastes and preferences. In other embodiments, the positioning may be fixed to predetermined positions.

Figure 3:
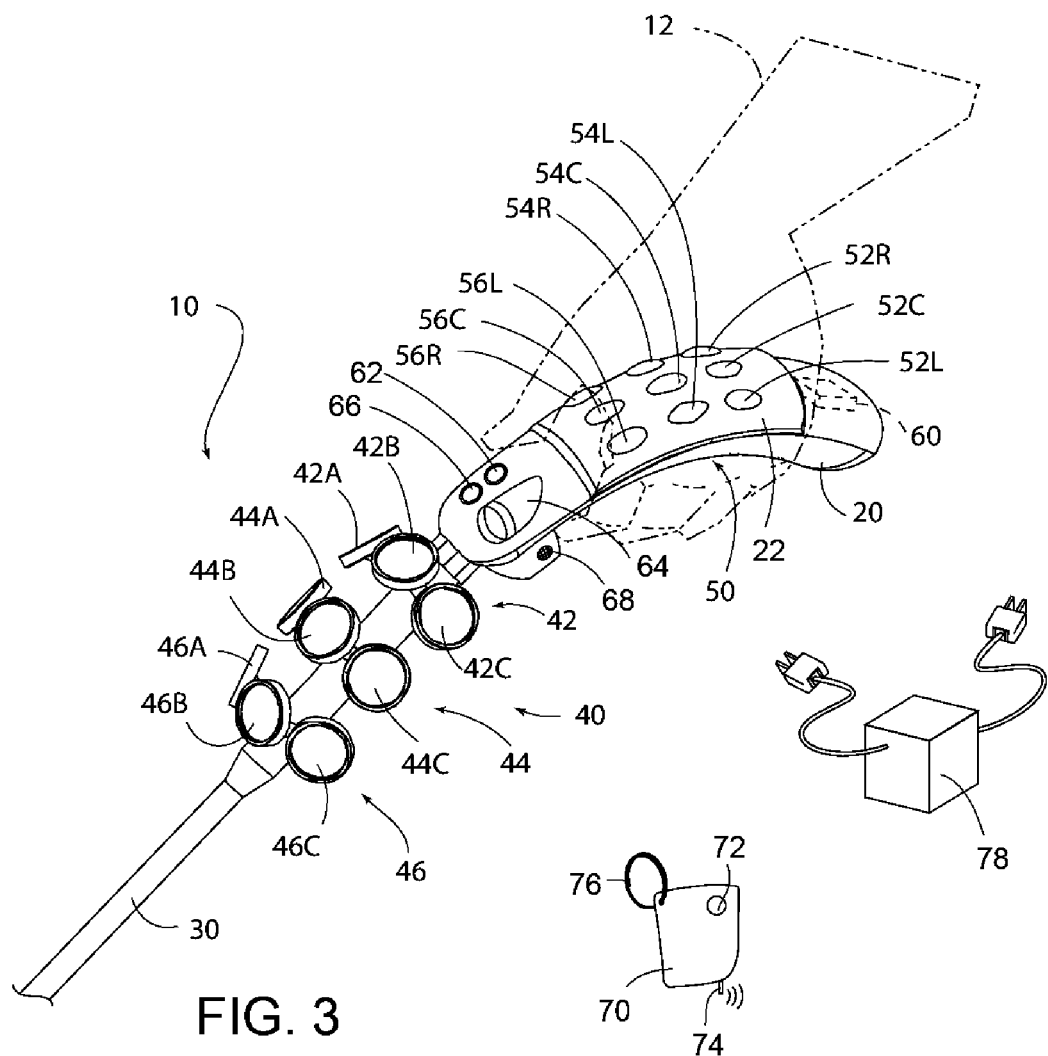
FIG. 3 is a perspective view of a handle of the mobility director device and cane, illustrating how a user holds the handle to contact a plurality of vibrating tactile transmitters.

FIG. 3 is a perspective view of the handle 20 of the mobility cane 10. In the embodiment of FIG. 3, the detection apparatus 40 includes three detection arrays 42, 44, and 46. An upper detection array 42, a middle detection array 44, and a lower detection array 46 are included in the detection apparatus 40. The upper detection array 42 includes an upper right detector 42R, an upper center detector 42C, and an upper left detector 42L. Similarly, the middle detection array 44 includes a middle right detector 44R, a middle center detector 44C, and a middle left detector 44L; and the lower detection array 46 includes a lower right detector 46R, a lower center detector 46C, and a lower left detector 46L.

Each detector 42 corresponds with a portion of the predetermined spatial zone 41. In the present embodiment, as illustrated in FIGS. 1 and 2, the upper detection array 42 detects objects in an upper spatial zone 43, the middle detection array 44 detects objects in a middle spatial zone 45, and the lower detection array 46 detects objects in a lower spatial zone 47.

Each zone is defined by the relative positioning of the detection arrays 42, 44, and 46, and the settings of the detection arrays 42, 44, and 46. For example, the middle spatial zone 45 has a width W defined by the angles of the detectors of the middle detection array 44, and a depth D defined by the settings of the detectors. The width W should be wide enough to detect objects that may strike the person 12, and the depth D should be far enough to give adequate warning to the person 12 without reporting objects that are too far away to be of concern to the person 12. These setting may be somewhat adjustable by the person 12 so that the cane 10 meets the needs of the person 12.

Figure 2:
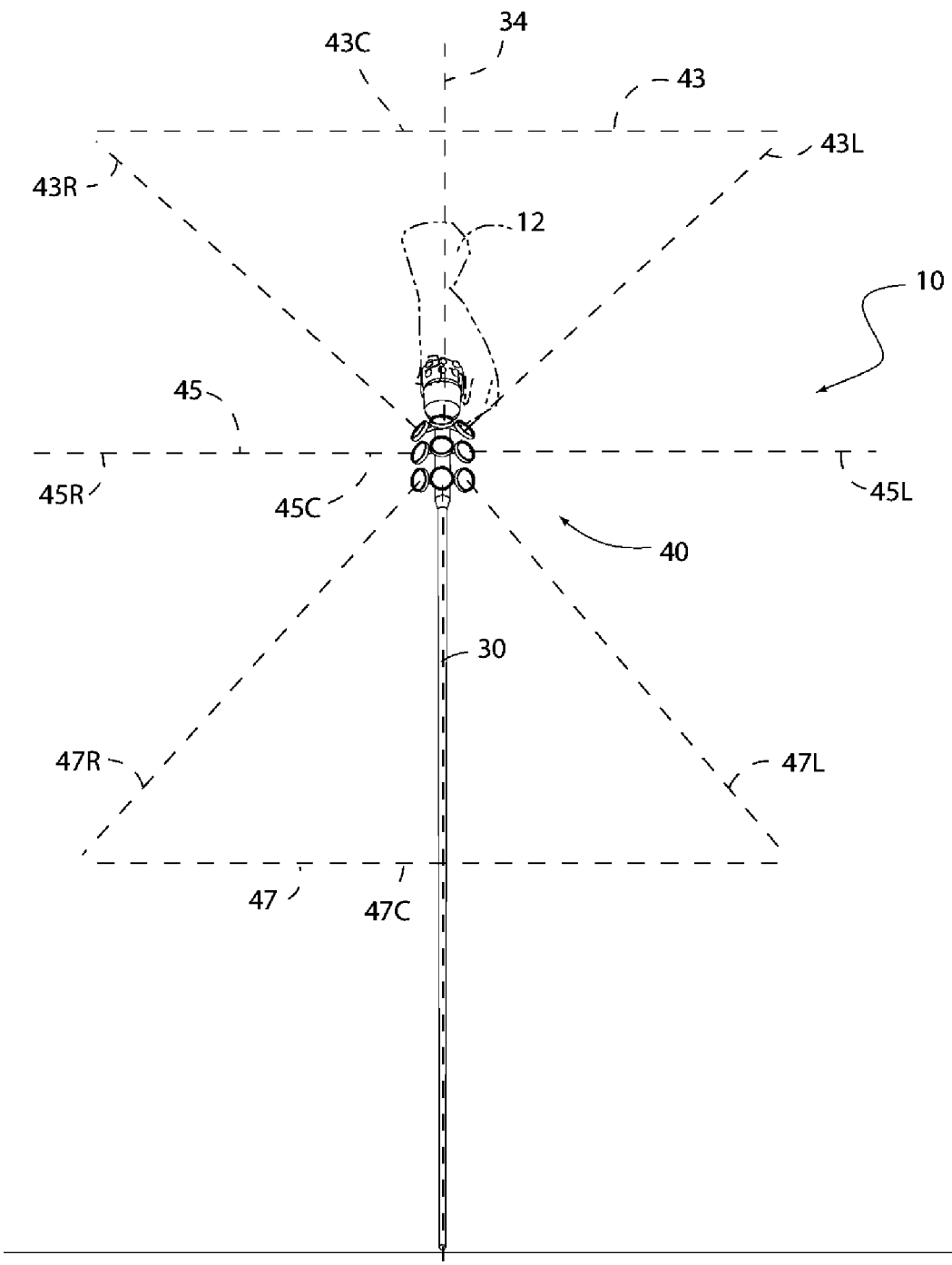
FIG. 2 is a front elevational view thereof.

As illustrated in FIGS. 2 and 3, in this embodiment the upper right detector 42A detects objects in an upper right zone 43R, the upper center detector 42B detects objects in an upper center zone 43C, the upper left detector 42C detects objects in an upper left zone 43L.

Similarly, the middle right detector 44A detects objects in a middle right zone 45R, the middle center detector 44B detects objects in a middle right zone 45R, and the middle left detector 44C detects objects in a middle right zone 45R. Further, the lower right detector 46A detects objects in a lower right zone 47R, the lower center detector 46B detects objects in a lower right zone 47R, and the lower left detector 46C detects objects in a lower right zone 47R.

As shown in FIG. 3, the plurality of vibrating tactile transmitters 50 are arrayed along the outer surface 22 of the handle 20. Each of the plurality of vibrating tactile transmitters 50 is operably connected to a separate one of the plurality of detection sensors 40. This results in one vibrating tactile transmitter 52R being operably connected to one detection sensor 42A.

When one detection sensor 42A detects an object, one of the vibrating tactile transmitters 52R is activated. The location of the vibrating tactile transmitter 52R along the outer surface 22 of the handle 20 would indicate to the ambulatory visually impaired person 12 which detection sensor 42A had detected an object. This would indicate to the ambulatory visually impaired person 12 where the object is located and allow him or her to adjust his or her movements to avoid hitting the object.

As illustrated in FIG. 3, the plurality of vibrating tactile transmitters 50 include one transmitter for each detectors 40, disposed so that the user can discern which zone the obstruction is located. The upper right detector 42A may be operably connected to the upper right tactile transmitter 52R, the upper center detector 42B is operably connected to the upper center tactile transmitter 52C, and the upper left detector 42C is operably connected to the upper left tactile transmitter 52L.

Similarly, the middle right detector 44A is operably connected to the middle right tactile transmitter 54R, the middle center detector 44B is operably connected to the middle center tactile transmitter 54C, and the middle left detector 44C is operably connected to the middle left tactile transmitter 54L; and the lower right detector 46A is operably connected to the lower right tactile transmitter 56R, the lower center detector 46B is operably connected to the lower center tactile transmitter 56C, and the lower left detector 46C is operably connected to the lower left tactile transmitter 56L. The detectors 40 and the transmitters 50 are powered by battery 60 or other suitable power source.

In operation, illustrated in FIGS. 1-3, when a tree or other object enters the upper spatial zone 43, one or more of the upper tactile transmitters 52R, 52C, and/or 52L vibrates, indicating to the person 12 exactly where the obstruction lies, so that he or she can avoid the object without injury.

In the embodiment of FIG. 3, the mobility cane 10 includes a first button 62 operably positioned to enable the person 12 to operably control a flashlight 64 operably mounted on the mobility cane 10. The flashlight 64 is highly useful for persons who are not completely blind, but are severely impaired, and may require additional light in some circumstances.

As shown in FIG. 3, the mobility cane 10 may also include a panic button 66 which actuates a siren 68, wherein the siren 68 includes any loud audible response. In this embodiment, if the person 12 feels threatened, he or she can press the panic button 66 and the siren 68 would sound an alarm, and the flashlight 64 could also flash a visual alarm to alert other persons to the trouble.

In the embodiment of FIG. 3, the mobility cane 10 further includes a remote locator device 70. Upon pressing a locator button 72 on the remote locator device 70, a wireless transmitter 74 signals the mobility cane 10 to provide an audio and or visual signal, using the flashlight 64 and or the siren 68, thereby facilitating the person in finding the cane 10. The remote locator device 70 may include a key ring 76 for keeping the device 70 with the person's keys, or other useful addition to assist in keeping the locator device 70 handy.

As shown in FIG. 3, the mobility cane 10 may be provided with a battery charger 78 to keep the battery charged. The battery charger 78 may be a simple electronic connector, or it could be a cradle (not shown) that holds the cane 10 and charges it.

Figure 4:
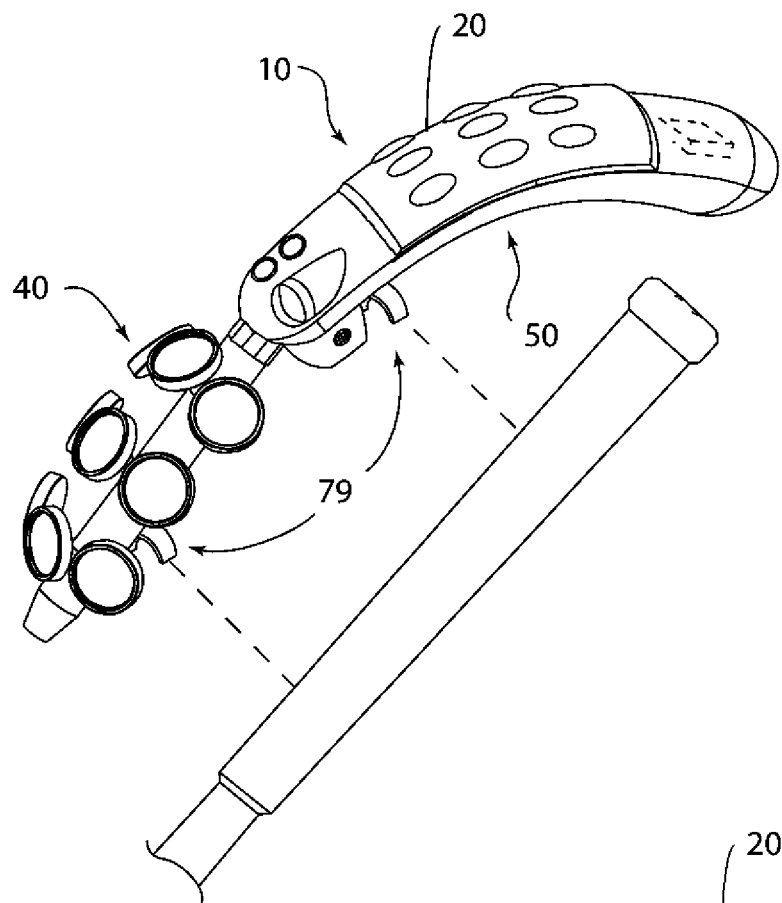
FIG. 4 is an exploded view of the mobility director device and cane, illustrating the handle detached from a elongated member according to an alternate embodiment of the invention.

FIG. 4 is an exploded view of the mobility director device and cane 10, illustrating the handle 20 and/or detection apparatus 40 detached from the elongated member 30, and attachable with a clip 79. As shown in FIG. 4, in this embodiment the elongated member 30 may be a traditional cane, or another suitable elongate element. For purposes of this application, the term "clip" shall mean any form of elements that frictionally engage the elongated member 30, and shall also be defined to include similar or equivalent engagement mechanisms or elements, including but not limited to locking screws or arms, adhesive pads, various forms of clamping mechanisms, and any other structure that may be developed by those skilled in the art.

Figure 5:
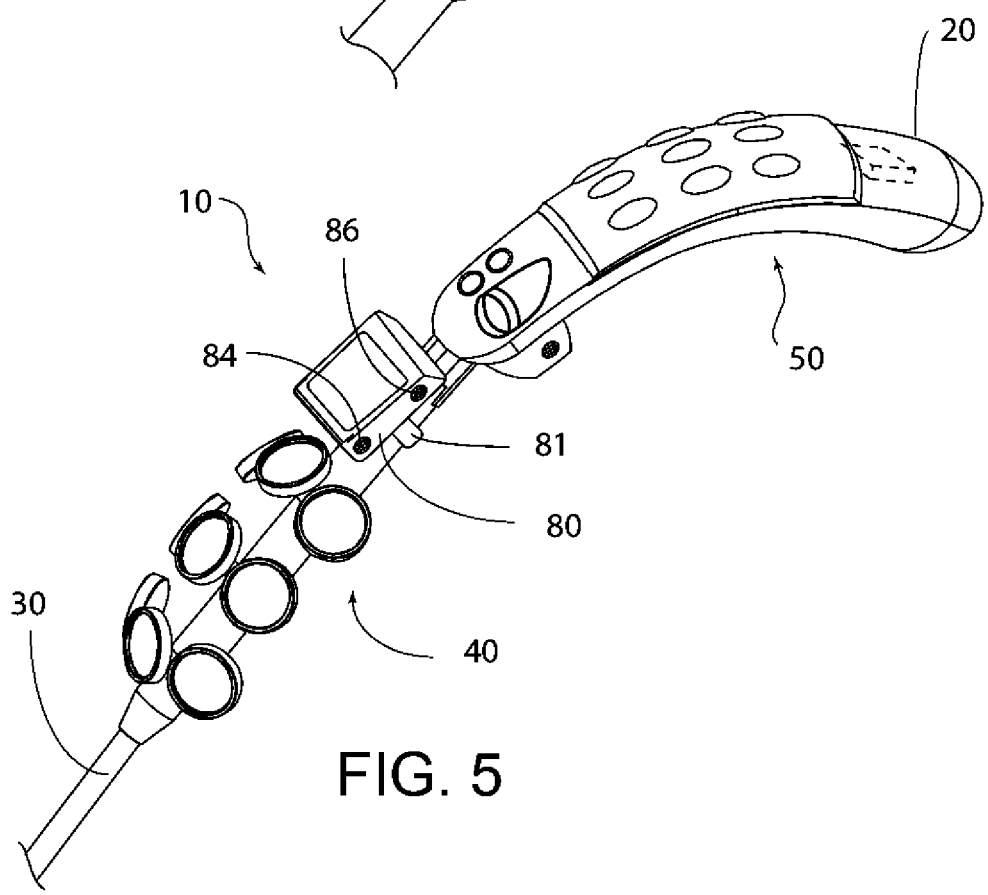
FIG. 5 is a perspective view of a handle of the mobility director and cane, illustrating an alternate embodiment that includes a GPS unit.

FIG. 5 is a perspective view of a handle 20 of the mobility director and cane 10, illustrating an alternate embodiment of the invention wherein the mobility cane 10 may include a global positioning system 80 ("GPS") for guiding the user 12. The term GPS 10 is hereby defined to include global navigation satellite systems such as known in the art, and also any similar or equivalent directional devices or systems known in the art, or later developed. The GPS 80 may include a clip element 82 to facilitate to mounting of the GPS 80 on the handle 20, as illustrated, or alternative to the elongated member 30 directly. The GPS 80 may also include a microphone 84 for receiving verbal data input from the user 12, such as a desired destination, and a speaker 84 for providing audible directions to the user 12 to guide him or her to the desired destination.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A mobility cane for use by a visually impaired person walking on a ground surface to alert the visually impaired person of an obstacle, the mobility cane comprising:

a walking cane that extends along a longitudinal axis a length such that the walking cane is capable of being maintained at a fairly constant acute angle with respect to the ground surface by an extended hand of the ambulatory visually impaired person;

a handle having generally cylindrical shape adapted to be grasped and fit within the hand of the visually impaired person such that an outer surface contacts the hand of the visually impaired person;

a detection apparatus operably mounted on the handle for detecting the presence of the obstacle in front of the visually impaired person when the handle is held by the visually impaired person and the walking cane is operably positioned at the fairly constant acute angle with respect to the ground surface, the detection apparatus including three detection arrays, an upper detection array, a middle detection array, and a lower detection array;

a pair of C-shaped clips extending, one from the handle and one from the detection apparatus, each shaped to fit mostly around the walking cane, for mounting the handle and detection apparatus together on the walking cane such that the handle and detection apparatus are together readily detachable from the walking cane;

the upper detection array including an upper right detector, an upper center detector, and an upper left detector;

the middle detection array including a middle right detector, a middle center detector, and a middle left detector;

the lower detection array including a lower right detector, a lower center detector, and a lower left detector, with each detector corresponding with a portion of a predetermined spatial zone such that the upper right detector is positioned for detecting detects objects in an upper right zone, the upper center detector is positioned for detecting objects in an upper center zone, the upper left detector is positioned for detecting objects in an upper left zone, the middle right detector is positioned for detecting objects in a middle right zone, the middle center detector is positioned for detecting objects in a middle center zone, and the middle left detector is positioned for detecting objects in a middle left zone, the lower right detector is positioned for detecting objects in a lower right zone, the lower center detector is positioned for detecting objects in a lower center zone, and the lower left detector is positioned for detecting objects in a lower left zone; and a plurality of vibrating tactile transmitters arrayed on the outer surface of the handle for alerting the visually impaired person of the obstacle responsive to the detection apparatus, with each of the plurality of vibrating tactile transmitters being operably connected to a separate one of the plurality of detection sensors, with the upper right detector being operably connected to an upper right tactile transmitter, the upper center detector being operably connected to an upper center tactile transmitter, the upper left detector being operably connected to an upper left tactile transmitter, the middle right detector being operably connected to a middle right tactile transmitter, the middle center detector being operably connected to a middle center tactile transmitter, the middle left detector being operably connected to a middle left tactile transmitter, the lower right detector being operably connected to a lower right tactile transmitter, the lower center detector being operably connected to a lower center tactile transmitter, and the lower left detector being operably connected to a lower left tactile transmitter, the tactile transmitters being thus disposed so that the visually impaired person can discern, which zone the obstruction is located based upon the relative portion of his or her hand that receives the tactile stimulation.

\* \* \* \* \*